United States Patent [19]

Kroll

[11] Patent Number: 4,813,504
[45] Date of Patent: Mar. 21, 1989

[54] LOAD CELL STRUCTURE

[76] Inventor: William P. Kroll, 2382 Pioneer Trail, Medina, Minn. 55340

[21] Appl. No.: 199,598

[22] Filed: May 27, 1988

[51] Int. Cl.⁴ ............................ G01G 3/14; G01L 1/22
[52] U.S. Cl. .................................. 177/211; 73/862.66
[58] Field of Search ................... 177/211; 73/862.65, 73/862.66

[56] References Cited

U.S. PATENT DOCUMENTS

| | | | |
|---|---|---|---|
| 4,364,280 | 12/1982 | Kutsay | 73/862.66 |
| 4,516,646 | 5/1985 | Bergfalk | 73/862.66 X |
| 4,546,838 | 10/1985 | Ormond | 177/211 |
| 4,744,254 | 5/1988 | Barten | 177/211 X |

Primary Examiner—George H. Miller, Jr.
Attorney, Agent, or Firm—Anthony G. Eggink

[57] ABSTRACT

Wheel scale assemblies and load cell structures are provided for weighing loads. The invention provides a low profile portable wheel scale assembly of a predetermined height. The scale assembly has a thin lightweight base structure and a cooperating load platform. At least one load cell structure having strain gauges is in communication with the base structure and the load platform at predetermined locations and configurations. A platform support structure is provided to distribute the platform load. A unitary shear load cell structure contacts the weighing platform and provides a structural weight bearing component. The load cell structure has a unitary symmetrical load cell body. The load cell body has a centrally spanning elongated, deflectable beam structure. Opposing lateral indented beam portions for a central stress isolation web for the structural support and weighing of the load. Strain gauges are mounted in predetermined orientations to the parallel lateral beam walls. And, predetermined load cell configurations and arrangements are provided for low profile weighing scales.

20 Claims, 8 Drawing Sheets

LOAD CELL STRUCTURE

BACKGROUND OF THE INVENTION

This invention relates to wheel scale assemblies and load cell structures for weighing loads. Particularly, this invention relates to improved portable electronic wheel scales having predetermined load cell structures and arrangements to provide lightweight, low profile and accurate weighing scales.

A co-pending U.S. patent application entitled, "Low Profile Wheel Scale Assembly", Ser. No. 199,478 filed 5-27-88 by applicant Kroll has also been filed. That application further describes and claims low profile wheel scales which utilize the load cell structures of this invention.

Applicant has previously disclosed wheel scale and load cell assemblies in U.S. Pat. No. 4,714,121. The wheel scale assembly of this invention is of a lower profile, a different structure and also shows the use of new and improved load cell structures. Although the present load cells are also of the shear load cell type, they have different configurations and function with different cooperating wheel support plate structures.

Wheel scales or platform scales are commonly used to measure axle weight loads of vehicles, such as trucks. And, although some platform scale devices are designed to accommodate the multiple wheels of dual tandem rear axle assemblies of commercial trucks, most wheel scale devices have a single platform to measure the load from single or dual wheels.

In use, a pair of wheel scales are spaced apart and the vehicle is driven onto the scale platforms one axle at a time. Each axle weight load is recorded and the summation of axle weights yields the gross weight of the vehicle.

Wheel scales utilizing load cells for weighing axle loads of motor vehicles are known in the weighing art. Additionally, wheel scales which utilize strain gauge sensors fixed to deflectable load cells are known. However, the specific configuration of the load cells utilized in prior art scales, the placement of the load cells in the housing structures of these scales, and the cooperation of the active and inactive elements of these prior art wheel scale devices often yield complex and bulky wheel scales which are inaccurate and unrepeatable under many conditions of use.

For example, prior art wheel scale devices have been proposed and manufactured to use various types of load cell configurations for the purpose of yielding a lightweight, low profile and accurate portable wheel scale. Additionally, various wheel scale structures have been proposed and manufactured wherein these load cell configurations have been utilized with varying cooperative elements. However, these prior art wheel scale structures have often been difficult to transport and utilize, have been susceptible to damage, and have required the precise load placement of loads to achieve reasonable scale accuracy and repeatability.

Although load cell assemblies are usable in a variety of vehicle scale devices, there are specific requirements and difficulties associated with their use in portable wheel scales used by law enforcement officers, for example. Such portable wheel scales must be unitary, lightweight and rugged assemblies able to withstand the lateral forces resulting from the braking and skidding of truck tires.

Additionally, such portable wheel scales are preferably usable on a variety of road surfaces or terrains, should have low or thin profiles to prevent weighing inaccuracies caused by load shifts and are preferably accurate and reliable irrespective of precise wheel placement onto the platform structures. The load cell assemblies of this invention in conjunction and cooperation with the scale housing structure and load platform support structures provide such a low profile, reliable and accurate portable wheel scale.

Many types of load cell assemblies have been used or proposed for use in weighing scales as well as in portable wheel scales. And most such uses have required various load cell restraining and retention mechanisms. Depending upon configuration, these load cell fastening or restraining structures have often resulted in unreliable and unrepeatable load cell output. The load cell structures and wheel scale assemblies of this invention do not require the use of these load cell restraining mechanisms.

Despite the need for a truly portable, low profile, sturdy and accurate wheel scale device and load cell structures which overcome the problems associated with these prior art weighing scales and load cells, none in so far as is known, has been proposed or developed. Accordingly, it is the object of this invention to provide a lightweight, fully electronic, self contained, high capacity wheel load scale which has a low profile and which utilizes load cell structures and arrangements that provide for the accurate and repeatable weighing of loads under a broad range of environmental conditions.

SUMMARY OF THE INVENTION

This invention provides a low profile portable wheel scale assembly of a predetermined height. The scale assembly has a thin lightweight base structure with an interiorly disposed opening having a bottom surface with means for receiving a load cell structure. At least one load cell structure having strain gauge means is in communication with the base structure. The load cell structure is mounted to the receiving means of the base structure bottom surface. A platform engaging means has means for engaging the load cell structure and means for engaging a wheel platform member. A thin platform member has a flat top surface and a bottom surface with at least one predetermined indentation for receiving and engaging the platform engaging means.

This invention also provides a unitary shear load cell assembly constructed and arranged for direct contact with the weighing platform of a scale assembly and for providing a structural weight bearing component. The load cell assembly has a unitary symmetrical load cell body structure having a longitudinal axis and having flat peripheral bottom portions. The load cell body has a centrally spanning elongated, deflectable beam structure having a centrally disposed load receiving means. The beam structure is defined by spaced apertures through the body structure. The beam structure has a bottom surface higher than the remaining portions of the body structure. And, the load receiving means directly communicates with the weighing platform of the scale assembly.

A pair of opposing lateral beam portions are indented in the beam structure and have spacially parallel lateral walls which form a central stress isolation web and a localized I-beam configuration for the structural support and weighing of a load. Strain gauge means are mounted in a predetermined orientation to the parallel lateral beam walls. The strain gauge means is mounted at a perpendicular axis with respect to each other, each axis being at a predetermined angle with respect to a plane perpendicular the longitudinal axis of the load cell body structure.

Provided also by this invention are certain component configurations as well as materials of construction for these cooperating components. And, provided are methods of utilizing the cooperating elements of the scale assembly to achieve accurate and repeatable weighing results.

These and other benefits of this invention will become clear from the following description, by reference to the drawings.

DESCRIPTION OF THE PREFERRED EMBODIMENTS

Figure 1:
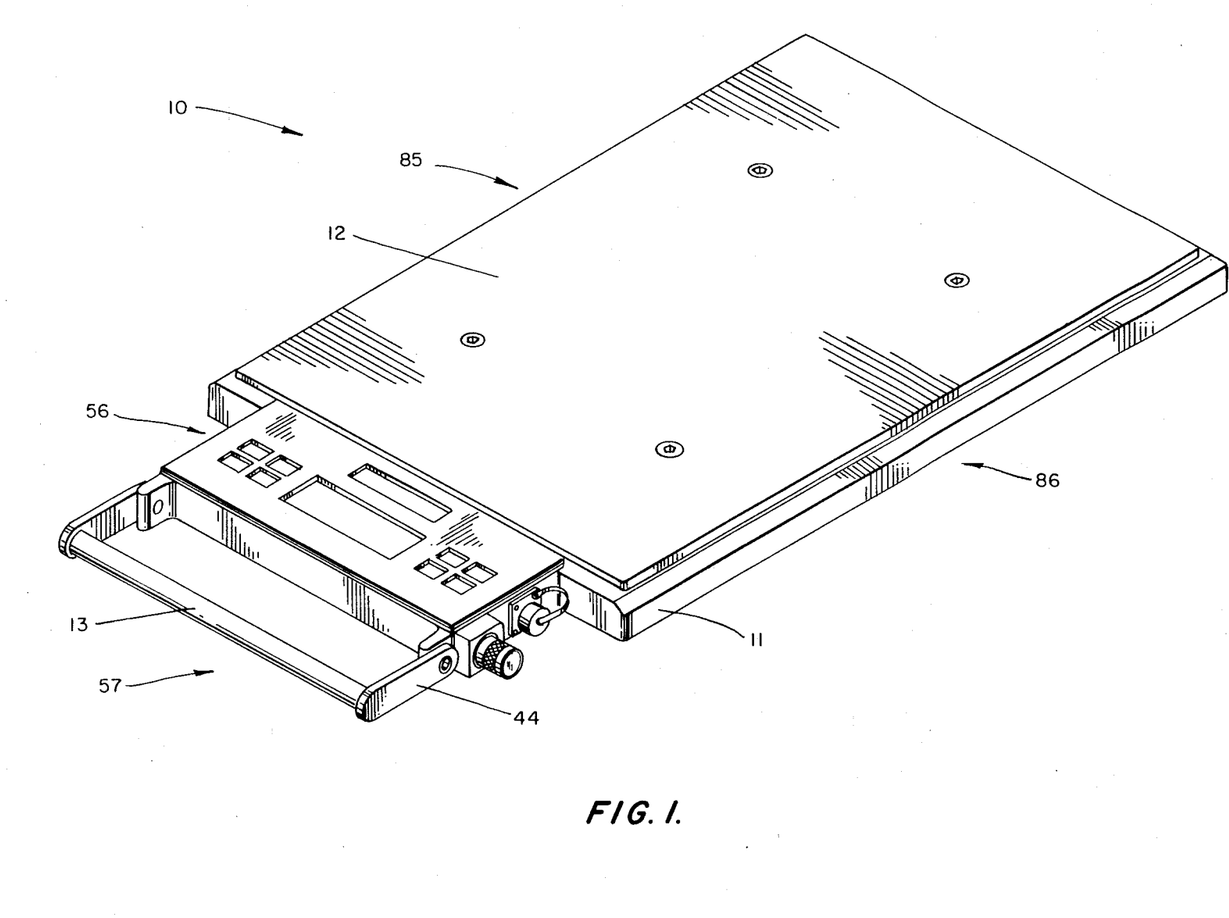
FIG. 1 is a perspective view of the low profile electronic wheel scale assembly of this invention.

Referring to FIG. 1, the low profile electronic wheel scale assembly 10 of the present invention is shown having a base structure 11, a wheel platform 12, a control/readout system 56, and a handle portion 57. The wheel platform 12 is disposed on the top of the base structure 11 to provide a low profile structure for supporting the wheel(s) of a vehicle or other load for weighing purposes. Entrance ends or sides 85 and 86 of the low profile wheel scale assembly 10 are utilized to provide a ramp access to the wheel platform 12 for vehicle wheels.

The wheel scale assembly 10 according to the invention provides a lightweight, electronic, self contained, high capacity wheel load scale. For example, one such scale has a capacity to weigh loads up to 60,000 lbs. with an accuracy of ±1%; the preferred weighing range being in the range of from 0 to 20,000 lbs. However, the teachings of this invention are also applicable to scales having other weight capacities. The wheel scale assembly 10 will operate accurately on a variety of surfaces including asphalt, concrete, crushed stones, gravel, hard packed soil, and soft ground without the use of risers or an additional base plate. Further, the water resistant, moisture resistant, and dirt resistant wheel scale assembly 10 is usable under all weather conditions and in a temperature range of, for example, from 14 to 122 degrees Fahrenheit.

The base structure or housing 11, and wheel or load platform 12 of the wheel scale assembly 10 are preferably constructed of high strength cast aluminum or a similar sturdy and durable material. The base structure 11 preferably has a grooved, nonskid surface on its bottom to prevent slipping and skidding of the wheel scale assembly 10 during use. The wheel scale assembly 10 has a very low profile or height. The wheel scale assembly 10 preferably has a height of approximately 1.5 inches or less which has been found suitable for use as a portable scale by law enforcement officers, for example, for use in vehicle load restriction enforcement. This low profile provides easy wheel access to the wheel platform 12 without the need for large ramp structures and also provides increased weighing accuracy and durability.

Figure 2:
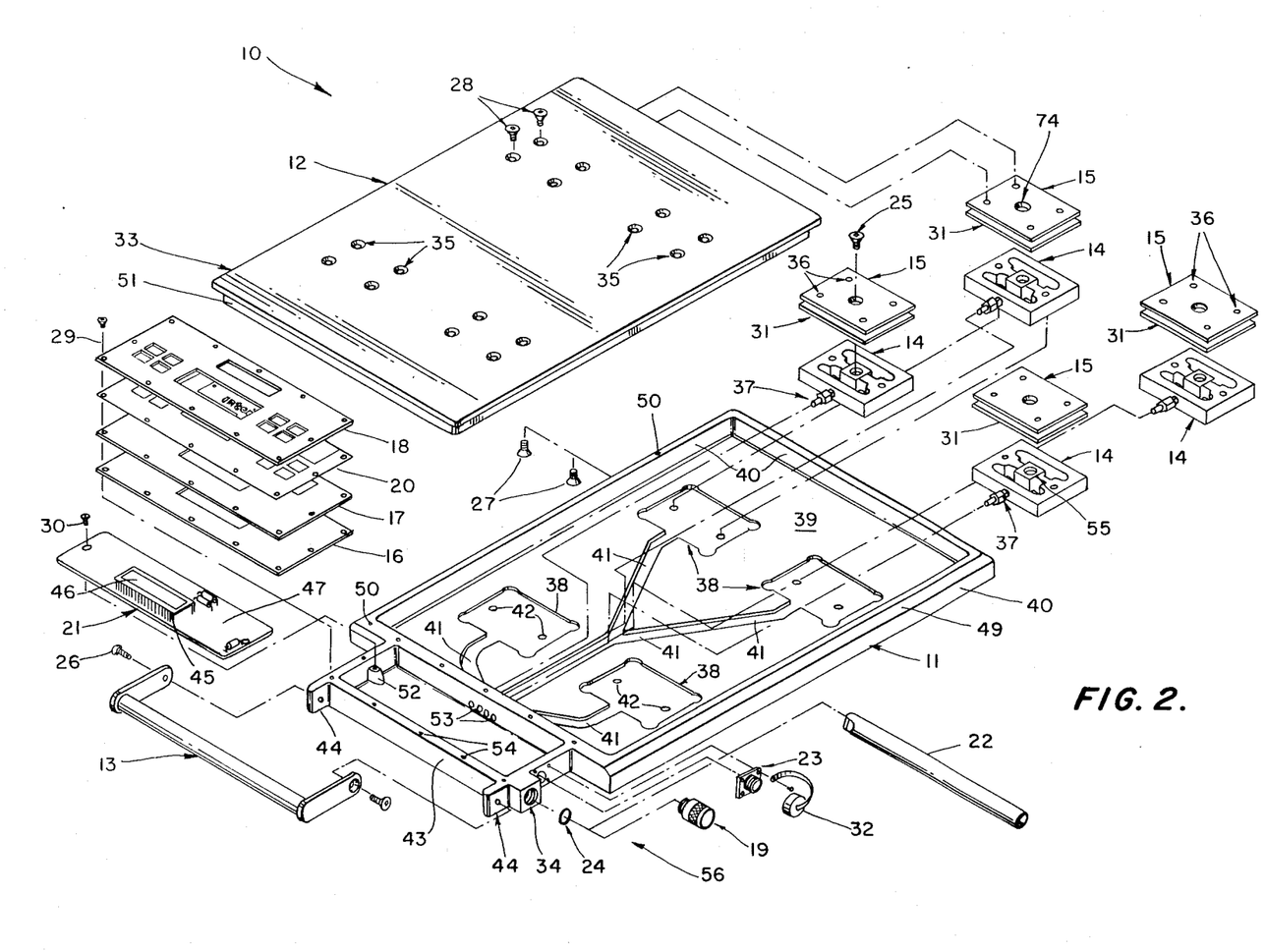
FIG. 2 is an exploded view in perspective of the low profile electronic wheel scale assembly showing the cooperating elements thereof.

FIG. 2 illustrates the various external and internal components of the wheel scale assembly 10 of this invention. The base structure 11 and wheel platform 12, described in further detail below, are shown as being generally rectangular and substantially coextensive in dimension with each other, for example, approximately 15.0×22.5 inches. The base structure 11 further has an open interior cavity with a substantially flat bottom surface 39. A plurality of low profile load sensing devices 14, preferably four as shown in FIG. 2, are mounted on the bottom surface 39 of the base structure 11 at predetermined locations and in a predetermined orientation with respect to the lateral sides or entrance sides 85 and 86. The load sensing elements 14 are preferably load cell structures detecting shear strain. The load cells are described in detail below and further in Applicant's co-pending U.S. patent application Ser. No. 199,728 for "Low Profile Wheel Scale Assembly". Platform supports or load support plates 15 are connected to the load cells 14 and to the wheel or load platform 12 to provide increased structural strength for higher load bearing scale capacity while maintaining a low profile scale structure. Thus, the platform supports 15 permit the platform 12 to have a lower profile.

The control/readout system 56 comprises a keypad housing 43 which is preferably integrally formed with the base structure 11 and composed of cast aluminum materials. The cast aluminum structure provides full EMI/RFI immunity for its internal circuitry. The keypad housing 43 has an open cavity at its top and houses the electronic components 21 and power source 22 of the system 56. The electronic components 21 of the system 56 are preferably disposed on a printed circuit board 47 for spacial economy, durability, and ease of manufacture and repair. The circuit board 47 is mounted within the keypad housing 43 on shock absorbing mounting elements 52 via screws 30. The circuit board assembly 47 is connected to the load cell structures 14 via a series of interconnect wiring (not shown).

Fixed to the control/readout system 56 is the replaceable handle structure 57 having a handle member 13 connected to opposing handle braces 44 via screws 26. Alternatively, the handle member 13 may be integrally formed with the cast aluminum handle braces 44. The handle structure 57 is angled upwards to allow full hand access for lifting of the wheel scale assembly 10 without contacting the ground or other scale 10 parts.

The circuit board assembly 47 includes an amplifier, a filter, an analog to digital converter, a microprocessor, a memory and a liquid crystal diode (LCD) or similar display 46. The microprocessor provides the following control features: automatic test; low power indication, malfunction alerting; automatic power down after a fixed period of time, for example, 10 minutes; auto-zero tracking; digital weight averaging; and manual calibration adjustment. The LCD display 46 is preferably connected to the circuit board assembly 47 via an elastomeric electrical connector 45 such as a STAX connector manufactured by PCK Elastomerics. The printed circuit board 47 is coated with a sealant which protects it from moisture and fungus, but which also allows repairs to be made to the circuit board 47 components. The circuit configuration 47 is also insulated from the remaining elements of the wheel scale assembly 10 to prevent accidental shock while in use.

The electronic components 21 are powered by a battery pack 22, which consists, for example, of six "AA" 1.2 volt Ni-Cd batteries which are rechargable, without removal, at the external connector 23. The external connector 23 is connected to the keypad housing 43 at an aperture 59 and has a connector cap 32. The batteries are preferably welded together in series and secured by a plastic heat shrink tubing. Such a battery pack 22 configuration provides easy removal and replacement of batteries without the use of tools, and also prevents battery corrosion from contaminating the remaining electrical components. A connector cap 99 and sealing O-ring 24 prevent entry of dirt and moisture, and maintains the battery pack 22 in a constant position for weighing operation which also avoids power loss. This configuration further provides shielding from electrical interference during charging, such as starting of the vehicle, radio transmission, or other electrical accessories. The battery pack 22 is insertable into the housing extension 43 at a threaded battery port 34 located at the side of the housing extension 43.

The external connector 23 also is designed for cable connection to communicate with additional scale assemblies 10, as will be discussed with respect to the operation of the scale assembly 10.

As further shown in FIG. 2, the control/readout system 56 has a protective face plate or bezel 18, a key pad 20 which has a number of switches, a key pad support 17, and a bezel gasket 16 which are sealably connected to the top edge of the keypad housing 43 via screws 29 in threaded apertures 54. These layered elements have apertures through which the display 46 is extended. The switches are preferably of a pressure sensitive waterproof membrane type. An "on" switch, when activated, causes the scale 10 to test all of the segments on the display 46 and then zero itself. There is also provided, a separate "off" switch for unambiguous operation by the operator. A "print" switch, when activated, transmits data via a connecting cable to another scale, printer or display (not shown). A "weight unit selector" switch provides optional reading in either pounds or kilograms. A "local/total" switch, permits a user to display either the weight on the specific scale 10 used (local) or to sum the total weight from a plurality of scales (total). A "test" switch tests the display 46 function by activating all of its segments. A "lamp" switch activates a light located behind the display 46 for night use. A "hold/release" switch permits the scale 10 to be in a "hold mode" where the scale 10 locks onto the first steady weight of 50 lbs. or greater for use in "in motion" weighing. When released, the scale display 46 will indicate actual weights.

Figures 3, 4, 5:
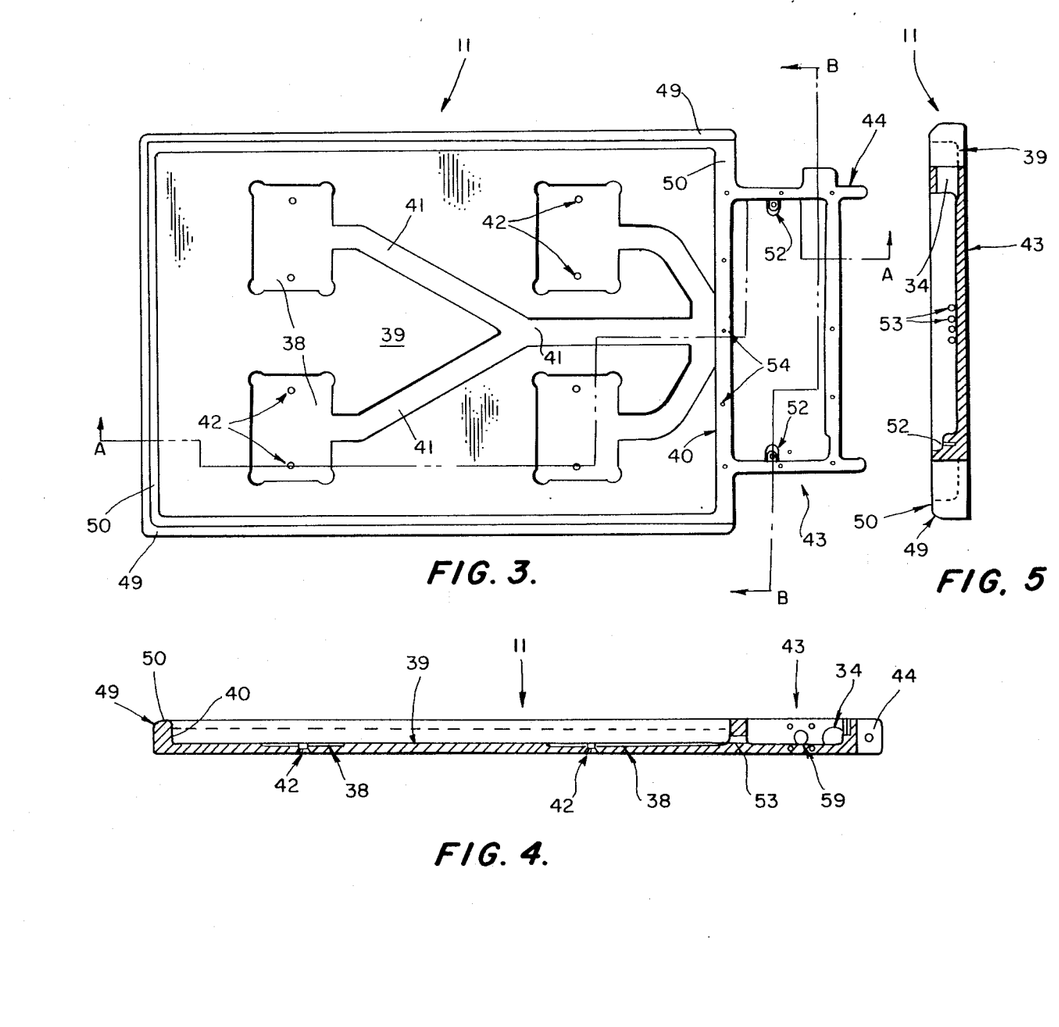
FIG. 3 is a top view of the base portion of the low profile electronic wheel scale assembly of FIG. 2.
FIG. 4 is a cross-sectional view of the base portion shown in FIG. 3, taken along line A—A.
FIG. 5 is a cross-sectional view of the base portion shown in FIG. 3, taken along line B—B.

Referring to FIGS. 3–5, the base structure 11 has vertical side walls 40 surrounding an open central cavity having a flat bottom 39. The side walls 40 have an angled portion 49 and a flat top 50. The angled portion 49 aids ongress and egress of vehicle wheels onto the scale assembly 10. The base structure 11 further has a plurality of generally rectangular load cell recesses 38 and integrally connected interconnect wiring recesses 41. The recesses 38 and 41 are approximately ⅛ inch deep indentations in the bottom surface 39 of the base structure 11 and are provided via a machining process. The recesses 38 and 41 are desireable where the base structure 11 is composed of cast aluminum (which yields a relatively rough finished surface) to provide a uniformly flat surface for load cell 14 function. The load cell recesses 38 have a horizontal dimension generally coextensive with that of the load cell structures 14. The load cell recesses 38 further have rounded and slightly enlarged corners to ensure the fit of the load cells 14 thereon. Apertures 42 are provided to receive flathead screws 27 for attachment of the load cells 14 to the base structure 11. The interconnect wiring recesses 41 extend from each load cell recess 38 to meet at the end of the cavity 39 proximate the keypad housing 43, thereby forming a generally branched configuration. A plurality of interconnect wiring apertures 53 are disposed in the base structure 11 wall between the central cavity 39 and the keypad housing 43 for extension of the interconnect wiring therethrough. Additionally, a sealant composition, such as a polyurethane, is preferably packed in the fitted apertures 53 to provide an environmental barrier.

Figure 6:
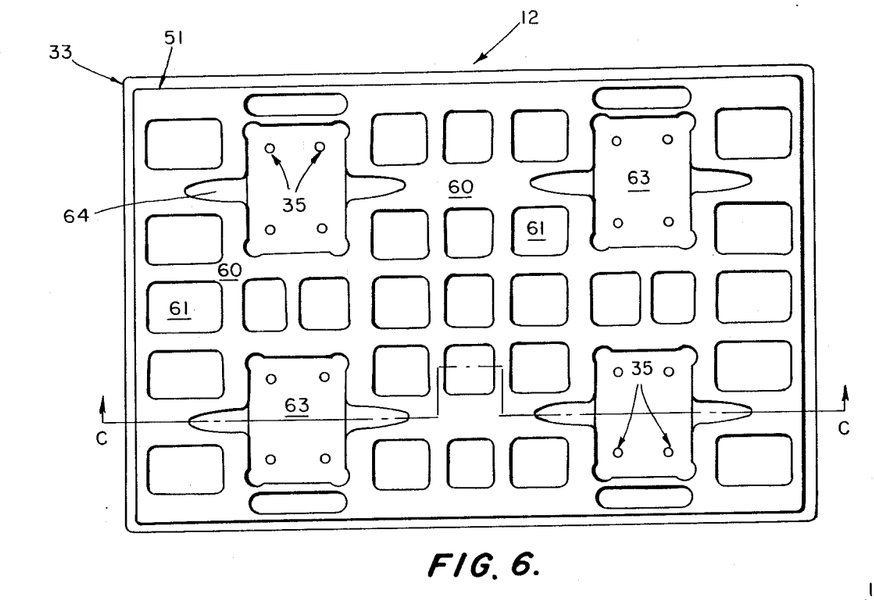
FIG. 6 a bottom view of the wheel platform of the low profile electronic wheel scale assembly of FIG. 2.
Figure 7:
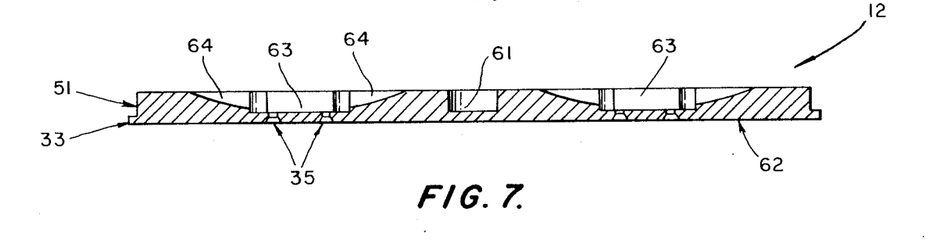
FIG. 7 is a cross-sectional view of the wheel platform shown in FIG. 6, taken along line C—C.
Figures 8, 9:
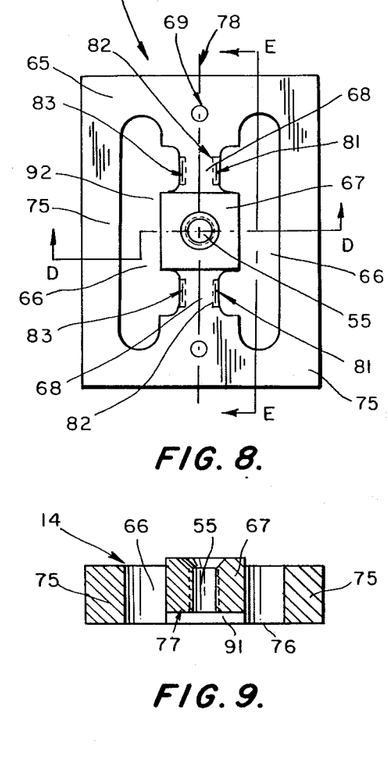
FIG. 8 is a top view of the load cell assembly of the low profile electronic wheel scale assembly of this invention.
FIG. 9 is a cross-sectional view of the load cell assembly shown in FIG. 8, taken along line D—D.
Figure 10:
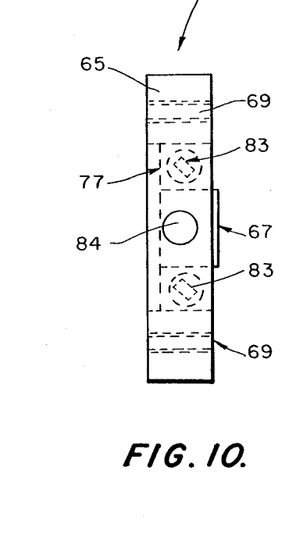
FIG. 10 is a side view of the load cell assembly shown in FIG. 8 which further shows the apertures therein.
Figure 11:
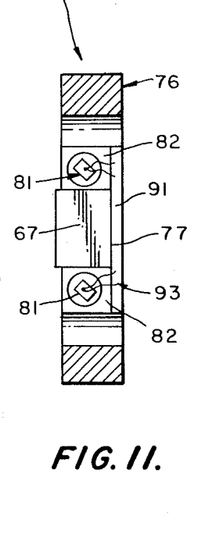
FIG. 11 is a cross-sectional view of the load cell assembly shown in FIG. 8, taken along line E—E.

Referring to FIGS. 6 and 7, the wheel platform 12 has a flat top surface and a molded bottom surface. The horizontal dimensions of the wheel platform 12 are generally coextensive with that of the base structure 11. Specifically, the wheel platform 12 top surface has a peripheral edge 33 with dimensions equal to the outside dimension of the base structure 11 flat top 50. The wheel platform 12 bottom surface area is indented or recessed slightly inward from the top surface edge 33 and forms an edge 51. The dimensions of the bottom edge 51 are equal to the inside dimension of the base structure 11 vertical wall 40 so that as the wheel platform 12 is placed in its operative position on the top of the base structure 11, its top edge 33 is aligned with the top edge 50 of the base structure 11. And, in this position, the bottom edge 51 registers with and is received by the interior cavity 39 of the base structure 11, within the inside dimension of the vertical wall 40. This base structure 11 and cooperating wheel platform 12 configuration yields a composite wheel scale structure 10 which allows vertical displacement of the wheel platform 11 for accurate and stable weighing, but which also controls horizontal displacement to prevent detrimental side loading effects. The configuration further provides a wheel scale 10 periphery which is accessible to vehicle wheels.

The wheel platform 12 bottom surface also has a plurality of indentations or pockets 61 which define perpendicular structural rib members 60. The pockets 61 reduce the weight of the cast aluminum wheel platform 12. Machined load cell recesses 63 are disposed in the bottom surface of the wheel platform 12. The load cell recesses 63 are aligned with the load cell recesses 38 of the base structure 11 when the wheel platform 12 and base structure 11 are in operative registration; the recesses 63 and 38 having coextensive horizontal dimensions for enclosure of the load cell structures 14. Apertures 35 are provided to receive flathead screws 28 for attachment of the platform supports 15, via threaded apertures 36, to the wheel platform 12. Wiring extensions 64 are integrally formed with the load cell extensions 63 for accomodation of the interconnect wiring.

An additional embodiment of the base structure 11 and wheel platform 12 may be utilized with the wheel scale assembly 10, consistent with the teachings of this invention. Referring to FIGS. 16-19, an alternate embodiment of the wheel scale platform 12 is shown to comprise a cast aluminum bottom portion 94, approximately 0.75 inches in thickness, and a steel top portion 95, approximately 0.1196 inches in thickness. The bottom portion 94 has load cell apertures 96 which extend fully through the structure. Screw apertures 97 are provided to directly connect the wheel platform top portion 95 via screw means. The wheel platform top portion 95 has screw apertures 98 which align with the screw apertures 97 of the bottom portion 94 for direct connection via the screw means. Also, screw apertures 99 are aligned with load cell apertures 96 for direct connection to platform supports 15 via screw means. The top portion 95 and bottom portion 94 have outer dimensions equivalent to those of wheel platform periphery 33 and periphery 51 respectively. This composite wheel platform structure, although heavier, yields a slightly thinner or lower profile scale assembly having substantially the same load bearing strength.

The composite wheel platform may be utilized with a base structure embodiment composed of approximately 0.1196 inch thick steel with a uniformly flat bottom surface similar in configuration to base structure 11 to further decrease the overall height of the scale. Because of the increased weight of the relatively stronger steel material, the resultant scale assembly has a weight increase in comparison to a totally cast aluminum structure. However, the steel/aluminum sandwiched structure provides a thinner wheel scale 10 having a thickness of approximately 1.18 inches (30 mm.).

Referring again to FIG. 2, the platform support or load support plates 15 are disposed between the load cells 14 and the wheel platform 12. The rigid platform supports 15 have horizontal dimensions generally equivalent to those of the load cells 14 and are composed of hardened 1095 spring steel or the like. Additionally, a closed cell polyurethane or a like construction gasket 31 is disposed between the platform supports 15 and the load cells 14 to aid in the manufacturing process and containment of sealant compositions to the load cells 14, as will be further described below. The platform supports 15 are connected to the load cells 14 via screws 25 through central platform support apertures 74 inserted into threaded load cell apertures 55. The platform supports 15 provide rigidity and strength to the cast aluminum wheel platform 12 at its recessed areas which transfer load to the load cells 14 for measurement purposes.

Figure 14:
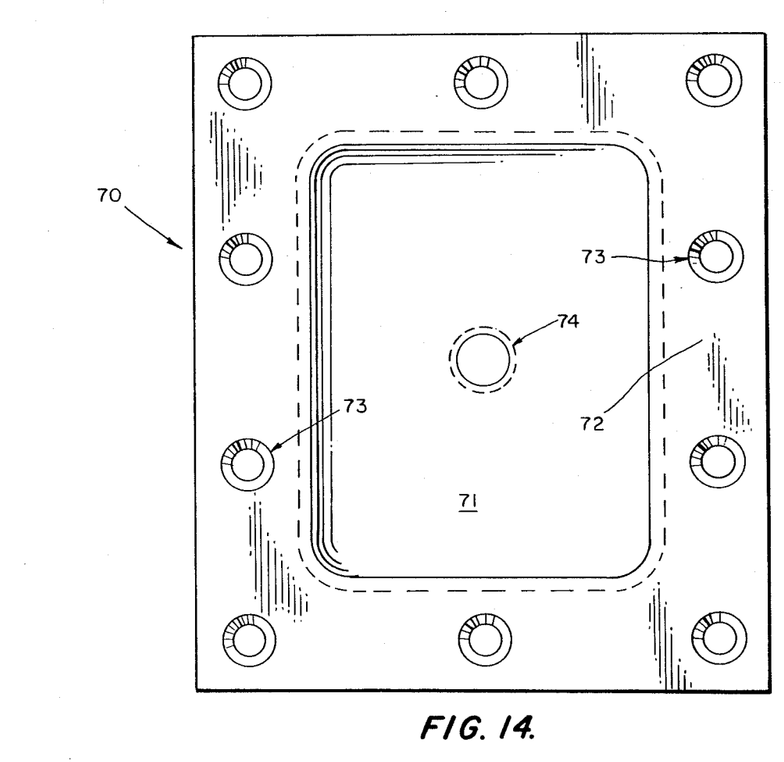
FIG. 14 is a top view of another embodiment of the platform support of the low profile electronic wheel scale assembly of this invention.
Figure 15:
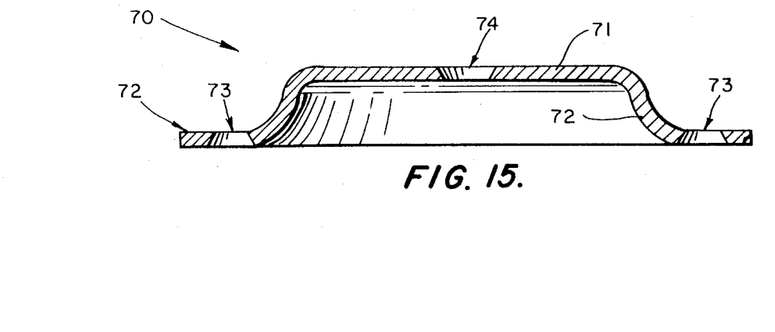
FIG. 15 is a cross-sectional view of the platform support shown in FIG. 14.
Figure 16:
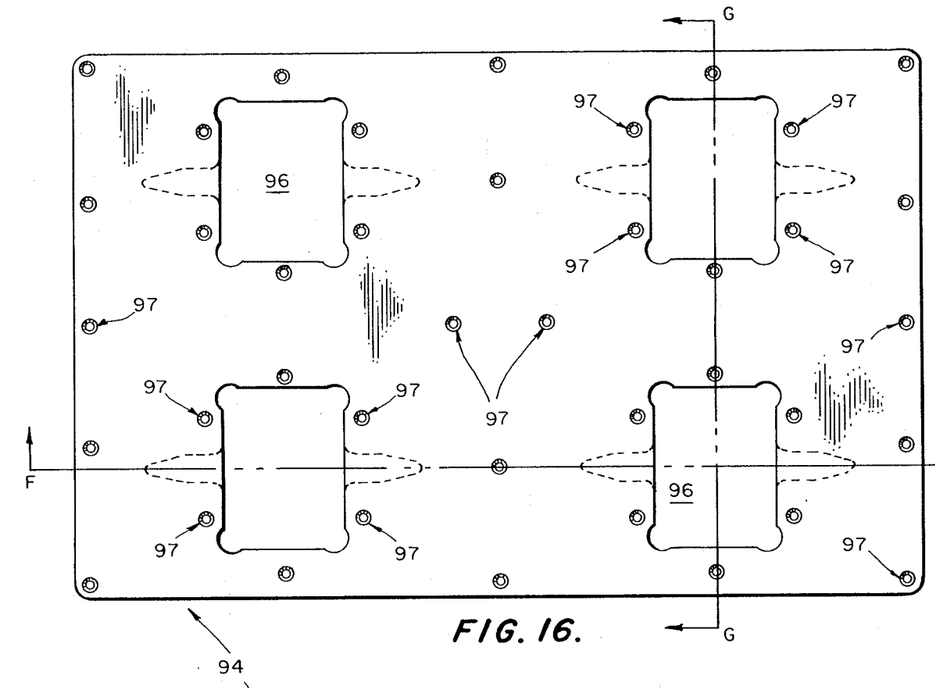
FIG. 16 is a bottom view of another embodiment of the wheel platform of the low profile electronic wheel scale and showing its cast aluminum lower portion assembly.
Figure 17:
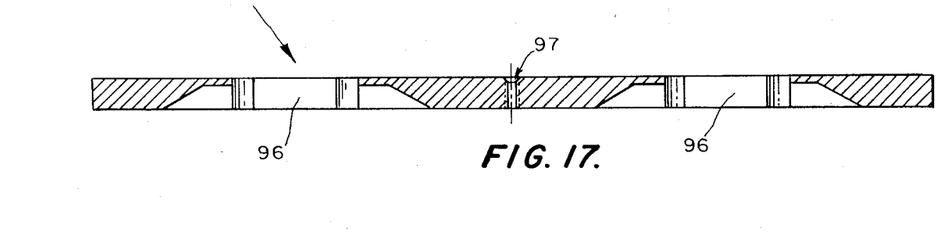
FIG. 17 is a cross-sectional view of the wheel platform shown in FIG. 16, taken along line F—F.
Figure 18:
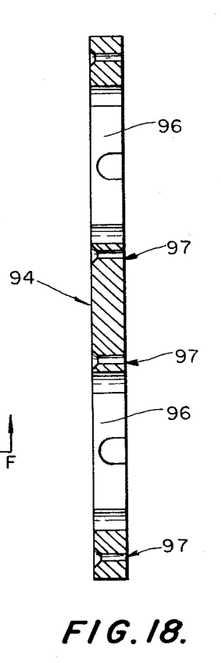
FIG. 18 is a cross-sectional view of the wheel platform shown in FIG. 16, taken along line G—G.
Figure 19:
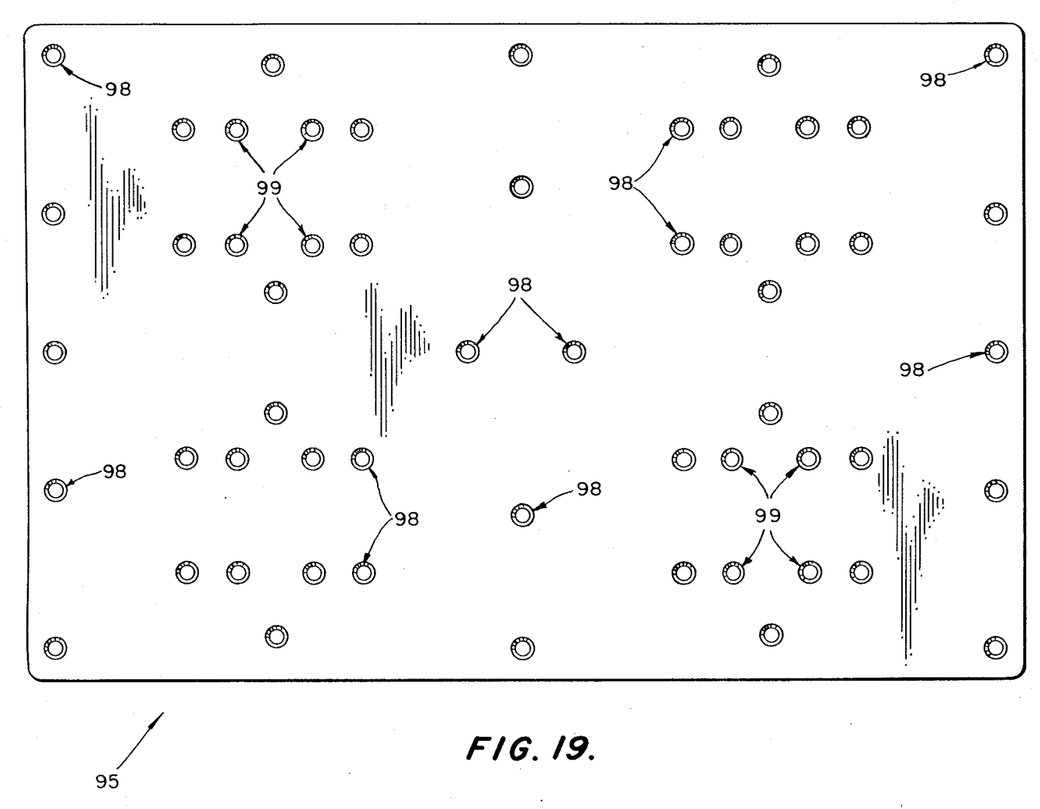
FIG. 19 is a top view of the steel top portion utilized with the wheel platform embodiment shown in FIG. 16.

FIGS. 14 and 15 show another embodiment 70 of the platform support. The platform support 70 has a raised, convex center portion 71 generally coextensive with the load cell 14 dimensions, and a peripheral horizontal, flanged rim portion 72. The convex center portion 71 has a central aperture 74 for connection to the load cell 14, while the rim portion 72 has a plurality of rim apertures 73. When in its operative position, the convex center portion 71 is in registration with the load cell recess 63 of the wheel platform 12 and with the load cell 14, while the rim portion 72 registers with the thicker portions of the wheel platform 12 immediately surrounding the load cell recess 63. In the use of this embodiment of the platform support 70, the screw apertures 35 of the wheel platform 12 are disposed in the thicker body structure of the wheel platform 12 immediately surrounding the load cell recess 63, so that they correspond with the rim apertures 73 of the platform support 70.

This platform support 70 structure provides increased strength to the wheel platform 12 and enhances load-bearing capacity through lateral load transfer. A load imparted to the relatively thinner load cell recess 63 areas of the cast aluminum wheel platform 12 is transferred to the steel central portion 71 of the platform support 70 (via direct contact therewith) and distributed laterally to the rim portion 72. The rim portion 72 is bolted, via screws 28 and the apertures 35 and 72, to the thicker portion of wheel platform 12, and hence yields increased load bearing capacity.

Referring to FIGS. 8-13, the symmetrical, self-supporting, self-contained and sealed load cells 14 are comprised of a flat, generally rectangular body structure 65 approximately 0.75 inches in height, having elongated peripheral body portions 75 for support and an elevated, double-ended, shear beam structure 92. The beam structure 92 is integrally formed with and longitudinally extends from one end of the body structure 65 to its other end along axis 78. A pair of open and preferably urethane filled cavities 66 in the body structure 65 are disposed on each side of the beam structure 92. The elevated beam structure 92 forms a beam deflection space 91 between its bottom surface 77 and the flat bottom surface 76 of the peripheral body portions 75.

The beam structure 92 is shown to have a generally square load bearing surface 67 which is centrally disposed on the beam structure 92 and elevated from the peripheral body portions 75. Other load bearing surface configurations are within the purview of this invention. Stress isolation areas 68 are located on both sides of the load bearing surface 67 in the beam structure 92. Each stress isolation area 68 is a uniform narrowed region of the beam structure 92 which has side walls 82 on both sides thereof to provide localized stress measurement areas in the beam structure 92. Apertures or recesses may be disposed in each side of each stress isolation area 68 for mounting the opposing strain gauges 81 and 83 to further provide increased stress isolation and to lessen torsional or twisting effects of the load cell body 65.

Figure 12:
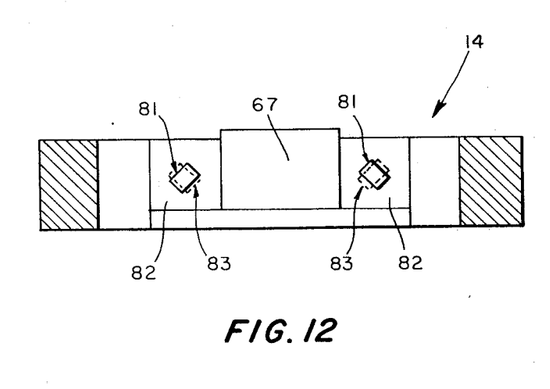
FIG. 12 is another cross-sectional view of the load cell assembly shown in FIG. 8, taken along line E—E, showing a specific strain gauge configuration.
Figure 13:
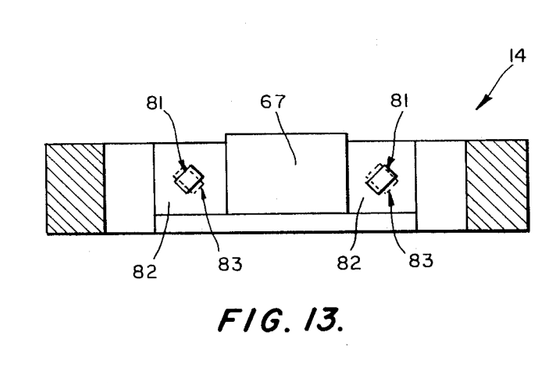
FIG. 13 is another cross-sectional view of the load cell assembly shown in FIG. 8, taken along line E—E, showing another strain gauge configuration.

The strain gauges 81 and 83 are oriented on the opposing sides 82 of the stress isolation areas 68, as shown in FIGS. 12 and 13 and further discussed below, to compensate for tension and compression forces in the beam structure 92. Strain gauges 81 and 83 are typically instrumental devices used to measure dimensional changes within or on the surface of a specimen, such as a load cell 14. The electrical-resistance strain gauge is a commonly used device for strain measurement. Its operation is based on the principle that the electrical resistance of a conductor changes when subjected to a mechanical deformation, i.e., due to weight on a load cell. The electrical conductor is bonded to the load cell 14 with an insulating cement, such as an epoxy with an acrylic outer coating, under no-load conditions. Thereafter, urethane is provided to the apertures 66, thus yielding a fully sealed load cell structure 14. A subsequent load, therefore, produces a deformation in both the load cell 14 and in the strain gauge 81 and 83 resistance elements.

Although a number of resistance strain gauge types are known, i.e., wire gauge, foil gauge and semi-conductor gauge, the bonded strain gauge is shown used in the load cells 14 of this invention. The bonded strain gauge, 81 or 83, as is known in the art, consists of lead wires 90 and active resistance wires which are mounted on a carrier sheet. To obtain maximum performance, the active resistance wires are mounted or cemented as near as possible to the gauging surface 82 of the load cell 14. Thus, when the active wire is stretched elastically, its strength and diameter are altered which results in a change in its electrical resistance. The measurement of this resistance change is the principle of operation of the gauge 81 or 83 in accordance with Poisson's ratio, crystal dislocation and elongation.

The cooperating flat peripheral body portions 75, elevated double ended beam structure 92, and beam deflection space 91 of the load cell structure 14 permit small, free vertical movement and shear deformation of the stress isolation areas 68. Thus, as a load or force is placed on the wheel platform 12, it is transferred directly to the load cell 14 via the platform support 15 or 70. As the force is exerted on the load cell 14, the stress isolation areas 68 are disfigured. This disfiguration causes the strain gauges 81 and 83 to be proportionally changed in configuration.

Importantly, the orientation and configuration of the load cells 14 with respect to the wheel platform 12 permits the proper deflection of the load cell beam structure 92 without potentially damaging side load effects and torquing. FIG. 2 shows the load cell 14 beam structures 92 being properly oriented perpendicularly with respect to the entrance sides 85 and 86 of the wheel scale 10. In this orientation, the beam structure 92 axis 78 is aligned in the direction of wheel or load movement. Thus, the load cell 14 is in an orientation designed to maximize strength and to withstand the effects of rapid load movement due to vehicle double clutching and braking.

The proper orientation or gauging of the strain gauges 81 and 83 on each mounted and aligned load cell 14 permits accurate weighing irrespective of the exact location of the load relative to the top of the wheel platform 12, for example due to uneven load placement or wheel scale 10 tilting. As shown in FIG. 12, strain gauges 81 and 83 are mounted on the opposite sides 82 of the stress isolation areas 68. Strain gauges 81 are mounted perpendicular to one another and at an angle of approximately 45 degrees with respect to the plane of the load cell 14 so that they are directed towards the center 67 of the beam 92. Strain gauges 83 are similarly mounted on the opposite walls, however, they are directed away from the center 67 and are therefore spacially perpendicular to strain gauges 81. Utilizing this strain gauge 81 and 83 configuration, the respective load cells 14 are preferably gauged so that the corresponding beam walls 82 of adjacent load cells 14 alternate between the configuration of strain gauges 81 and the configuration of strain gauges 83. In other words, where the beam walls 82 of a load cell 14 have gauges 81 directed towards beam center 67, the corresponding beam walls 82 of the adjacent parallel load cell 14 will have gauges 83 directed away from the beam center 67. It has been found that utilizing this strain gauge 81 and 83 configuration in respective cooperating load cells 14, the compressive and tensive forces on the several load cells are balanced to yield accurate and reproducable electrical responses under uneven load conditions; the uneven load effects being cancelled by this strain gauge configuration in a cooperating load cell arrangement.

FIG. 13 shows an alternate strain gauge configuration wherein strain gauges 81 are located on the same adjacent walls 82 of the beam structure 92 and in a spacially parallel configuration at 45 degree angles with respect to the horizontal plane of the load cell 14. Strain gauges 83 are similarly positioned on the opposite side walls of beam structure 92, parallel to one another, but spacially perpendicular to strain gauges 81. This strain gauge configuration has also been found to yield accurate and reproducible electrical responses. It has been found that utilizing this strain gauge configuration, adjacent and cooperating load cells 14 need not be alternately gauged on their corresponding beam walls 82 as discussed with respect to FIG. 12. Thus, this strain gauge arrangement in cooperating load cell configurations yields a structure that provides the benefits of the alternately gauged load cell configuration discussed above.

All four strain gauges 81 and 83 are electrically connected to a circular connecting plate assembly (not shown) proximate the threaded wiring aperture 84 in the peripheral body portion 75. As known, the gauges are connected essentially to the four corners of a wheatstone bridge on this plate or donut and the load cell is there calibrated. The connecting plate assembly is connected to the interconnect wiring via a compression fitting 37 disposed in the aperture 84. Preferably, waterproof sealant is disposed in the connector 37 as an environmental barrier.

The load cells 14 are preferably composed of 4340 chrome-molybdenum steel or the like for high strength and reliable deflection. Threaded apertures 69 are disposed in the base structure 65 of the load cells 14. These apertures receive screws 27 through apertures 42 for mounting of the load cells 14 to the base structure 11 of the wheel scale assembly 10. Threaded aperture 55 is centrally disposed in the load contacting member 67. This aperture receives screw 25 for mounting of the platform support, which is fastened to the wheel platform 12.

Alternative load cell embodiments known in the art may also be usable with the wheel scale assembly 10 of this invention, for example, load cells preferably sensing shear strain, including those effectively gauged as a beam. The important considerations being the low profile in accordance with the dimensions of the base structure 11 and that they are capable of reliable and reproducible results particularly when used in a load cell arrangement.

Other load cell structures may be devised utilizing the teachings of this invention, for example, load cell structures having non-rectalinear bodies or having more than one beam radiating from its load cell center. For example, a four-sided and double beamed structure would double the effective capacity of the wheel scale assembly 10.

Additionally the load cell structures of this invention are usable in a variety of weighing applications in addition to their use in portable wheel scales. The load cells 14 are self contained, self supporting and have a low profile; they can be utilized as a single structure and in cooperative load cell arrangements.

As many changes are possible to the embodiments of this invention, utilizing the teachings thereof, the descriptions above, and the accompanying drawings should be interpreted in the illustrative, and not in the limited sense.

That which is claimed is:

1. A unitary, self contained shear load cell assembly being constructed and arranged for contact with the weighing platform of a scale assembly and for providing a structural weight bearing component, said load cell assembly comprising:
    a. a unitary symmetrical load cell body structure having a longitudinal axis and having flat peripheral bottom portions and a centrally spanning elongated, deflectable beam structure having a centrally disposed load receiving means, said beam structure being defined by spaced apertures through said body structure, said beam structure having a bottom surface higher than the remaining flat peripheral bottom portions of said body structure, said load receiving means being for communication with the weighing platform of the scale assembly,
    b. opposing lateral beam portions in said beam structure having aligned, spacially parallel lateral walls to form a stress isolation area for the structural support and weighing of a load, and
    c. strain gauge means mounted in a predetermined orientation to each said parallel lateral beam wall.

2. The shear load cell assembly of claim 1, wherein said strain gauge means are mounted in a predetermined parallel and opposing arrangement on said lateral wall portions of said beam structure.

3. The shear load cell assembly of claim 1, wherein said load receiving means is a generally flat top surface having mounting means to receive a load or the weighing platform of a wheel scale assembly.

4. The shear load cell assembly of claim 1, wherein said lateral beam portions have opposing cylindrical apertures therein for receiving said strain gauge means.

5. The shear load cell assembly of claim 1, wherein said load cell body structure is of a rectilinear configuration constructed of a deflectable metal.

6. The shear load cell assembly of claim 1, wherein said oppositely disposed strain gauge means are mounted on said spacially parallel lateral walls at perpendicular forty-five degree angles with respect to said longitudinal axis.

7. The shear load cell assembly of claim 1, wherein a centrally disposed aperture is provided through one peripheral wall of said body structure for providing external communication with said strain gauge means.

8. The shear load cell assembly of claim 7, wherein said strain gauge means are mounted and protected with a sealing composition.

9. The shear load cell assembly of claim 1, wherein said load cell body structure has mounting means located through the top thereof for direct mounting to a base structure of a scale assembly.

10. The shear load cell assembly of claim 8, wherein said sealing composition is comprised of an epoxy adhesive layer, an acrylic layer and an exteriorly disposed polyurethane sealant.

11. A unitary and self contained double ended shear web cell assembly being constructed and arranged for direct contact with a load comprising:
    a. a symmetrical self supporting base structure having a central axis and being of a predetermined top plan configuration having a predetermined thickness and having a peripheral flat bottom surface,
    b. a load bridge structure integral and spanning said base structure and being centrally disposed on said central axis and being defined by opposing vertical apertures spacially aligned from said central axis, said load bridge structure having a central bottom surface portion spacially upward from said peripheral flat bottom surface,
    c. a load surface portion centrally located on said load bridge structure, said load surface portion extending above the remaining portions of said base structure, and
    d. strain gauge means mounted in a predetermined configuration to said load bridge structure a predetermined distance from said load surface portion and being disposed on a plane perpendicular thereto.

12. The double ended shear web cell assembly of claim 11, wherein said top plan configuration of said symmetrical base structure is rectalinear and wherein said base structure is constructed of a deflectable metal.

13. The double ended shear web cell assembly of claim 11, wherein said strain gauge means is comprised of two oppositely and spacially disposed pairs of strain gauges.

14. The double ended shear web cell assembly of claim 11, wherein said load surface portion of said load bridge structure has means for securing the assembly to a cooperating wheel scale support structure.

15. The double ended shear web cell assembly of claim 11, wherein said symmetrical base structure has means to mount said assembly to the interior housing of a wheel scale assembly.

16. The double ended shear web cell assembly of claim 13, wherein said load bridge structure has spaced lateral walls and wherein said oppositely disposed strain gauges are mounted at perpendicular forty-five degree angles to said lateral walls.

17. The double ended shear web cell assembly of claim 11, wherein said peripheral portion of said load cell base structure has an aperture therethrough to provide external communication with said strain gauge means.

18. The double ended shear web cell assembly of claim 11, wherein said load bridge structure has a pair of aligned and opposing apertures therein for receiving said strain gauge means.

19. The double ended shear web cell assembly of claim 11, wherein a sealing composition covers said strain gauge means, said sealing composition being comprised of an epoxy adhesive layer, an acrylic layer and an exteriorly disposed polyurethane sealant.

20. A unitary shear load cell assembly being constructed and arranged to receive a load comprising:
 a. a symmetrical body of a deformable material having peripheral flat support surfaces on the same horizontal plane and having a predetermined height,
 b. an end supported crossbeam structure united with said symmetrical body, said crossbeam structure having a bottom surface disposed upward from said peripheral flat support surfaces and having a height disposed upward with respect to the horizontal plane of said symmetrical body,
 c. a centrally disposed load bearing surface on said crossbeam structure, said load bearing surface extending above said predetermined height of said body,
 d. a pair of aligned and opposing lateral surfaces located inwardly said crossbeam structure on opposite sides of said centrally disposed load bearing surface, and
 e. strain gauge means mounted in a predetermined configuration on said crossbeam structure.

* * * * *